United States Patent [19]

Cucchi

[11] Patent Number: 5,522,689

[45] Date of Patent: *Jun. 4, 1996

[54] DEVICE WITH IMPROVED BAR GUIDE FOR LOADING BARS IN AUTOMATIC LATHES

[75] Inventor: Pietro Cucchi, Bussero, Italy

[73] Assignee: Pietro Cucchi S.p.A., Italy

[ * ] Notice: The term of this patent shall not extend beyond the expiration date of Pat. No. 5,520,493.

[21] Appl. No.: 194,685

[22] Filed: Feb. 10, 1994

[30] Foreign Application Priority Data

Feb. 19, 1993 [IT] Italy .................................. MI93A0318
Jun. 11, 1993 [IT] Italy .................................. MI93A1245

[51] Int. Cl.$^6$ ...................................................... B23Q 5/22
[52] U.S. Cl. .................................. 414/14; 82/127; 226/165
[58] Field of Search ........................... 414/18, 14, 17, 414/751; 82/124, 126, 127; 198/748, 586; 226/102, 128, 129, 165

[56] References Cited

U.S. PATENT DOCUMENTS 4,068,546  1/1978  Werkmeister .................... 82/127 X
5,170,685  12/1992  Cucchi .............................. 414/14 X Primary Examiner—Donald W. Underwood
Attorney, Agent, or Firm—Shlesinger, Fitzsimmons & Shlesinger

[57] ABSTRACT

A device (10,110) for loading bars in an automatic lathe comprises guide means (19,119,119') along which is supported and made to run a bar (12,112) with leading end projecting from said guide means to be inserted in a lathe chuck (11,111) to be grasped by handling means (21,121) of the lathe moving parallel to the bar axis to feed the bar under machining tools (31,131). At least a first part of the guide means (19,119,119') nearest the chuck has kinematic connection with the handling means (21,121) for moving axially and substantially synchronously therewith.

11 Claims, 2 Drawing Sheets

DEVICE WITH IMPROVED BAR GUIDE FOR LOADING BARS IN AUTOMATIC LATHES

BACKGROUND OF THE INVENTION

The present invention relates to a device for sequentially loading bars in an automatic lathe. Specifically it relates to a bar loader having an improved bar guide system.

In the known art there are automatic lathes which receive sequentially by means of special loaders bars from which to make parts or machined sections. The loader inserts axially the end of a bar at the rear of the lathe chuck. The chuck comprises a clamp or headstock which grasps the bar and moves it axially beneath the machining tools for a length predetermined to be the actual length of the work to be machined. After completion of machining of the work it is cut off and the clamp withdraws by running along the bar to return to the starting position, grasp the bar again and again advance to feed beneath the tools the section to be machined. The sequence of operations is repeated until the bar is exhausted. At this point the loader withdraws the remaining bar stub, discards it and inserts a new bar in the lathe so that the machining cycle can resume automatically.

There being inserted in the lathe only a short section of bar head, for the entire machining cycle the bar is supported at the rear by guide means integral with the loader structure. In known loaders, between the feed clamp and bar guide means there is however inevitably created progressively an ever greater space as the clamp moves to push the bar into the lathe. This allows bending and vibration of the bar which disturb machining performed by the lathe. In addition, the resonance vibrations produced in particular at the higher rotation speeds of the bar are difficult to damp by conventional methods of elastic suspension, the resonance frequency continuing to change depending on the breadth of the free space between the clamp and the guides.

SUMMARY OF THE INVENTION

The purpose of the present invention is to overcome the above shortcomings by supplying a device for loading bars into automatic lathes which would minimise the free spaces between the lathe and the guide means for the bar in the loader and make as uniform as possible the guidance of a bar fed to the lathe chuck.

In view of said purpose it is sought in accordance with the present invention to provide a device for loading bars into an automatic lathe comprising guide means along which is supported and made to run a bar with leading end projecting from said guide means to be inserted in a lathe chuck to be grasped by lathe handling means moving parallel to the bar axis to feed the bar under machining tools. At least a first part of the guide means nearest the chuck has kinematic connection with the handling means for moving axially and substantially synchronously therewith.

BRIEF DESCRIPTION OF THE DRAWINGS

To clarify the explanation of the innovative principles of the present invention and its advantages compared with the known art there is described below with the aid of the annexed drawings a possible embodiment thereof by way of nonlimiting example applying said principles. In the drawings.

DETAILED DESCRIPTION OF THE INVENTION

Figure 1:
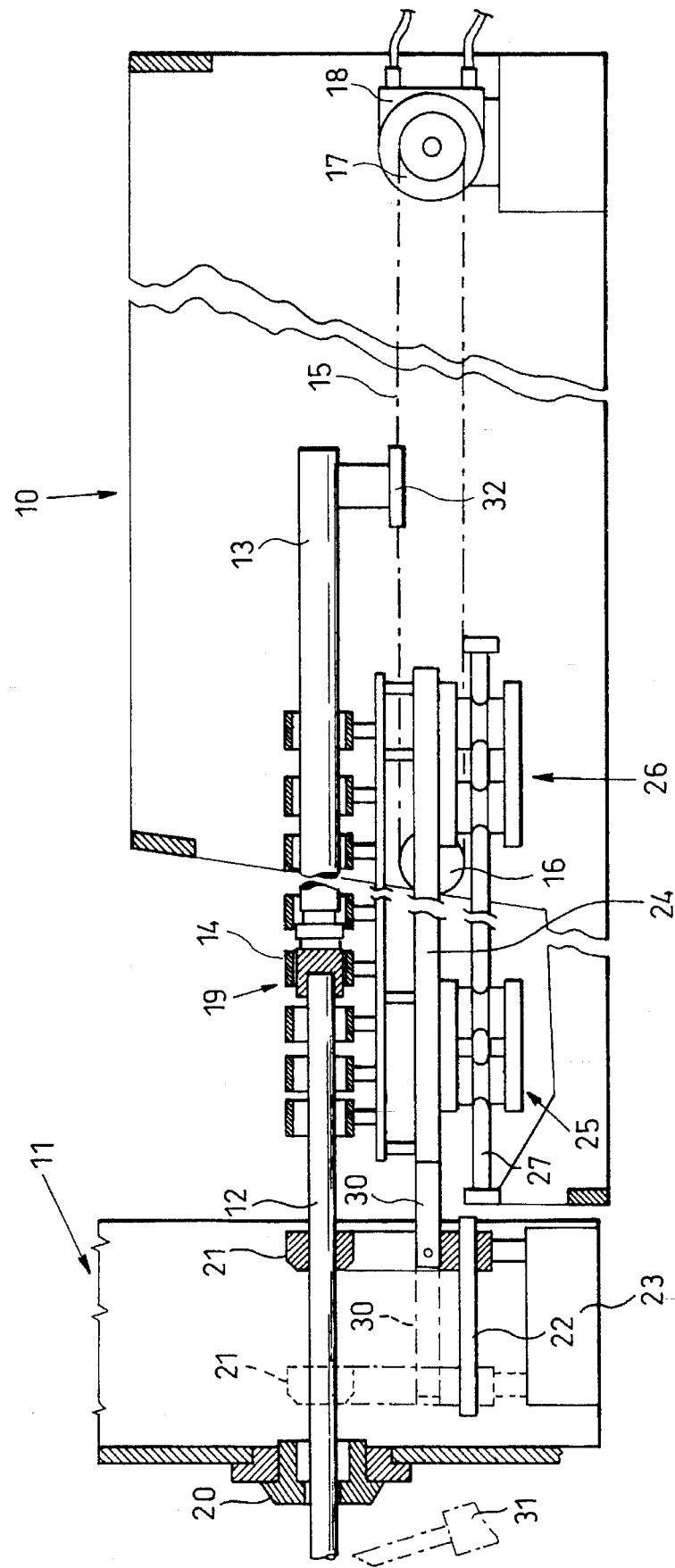
FIG. 1 shows a partial schematic cross section of a first embodiment of a bar loader in accordance with the present invention.

With reference to the figures FIG. 1 shows a machining unit or station made up of a loader 10 and a lathe. Of the lathe there is shown schematically only the chuck assembly 11 the rest being easily imagined by those skilled in the art and not affecting the present invention.

The loader supplies sequentially a bar 12 by inserting it axially into the lathe chuck assembly. For this purpose the loader comprises a pusher 13 aligned with the loading opening of the chuck 11 and bearing at its head a clamp 14 for grasping the tail of the bar to be fed. The pusher 13 is constrained at the rear to a cursor 32 displaced parallel to the extension of the bar pusher 13, e.g. by means of a transmission chain 15 wrapped around a pulley 16, 17. The chain is driven by a motor 18 (advantageously of the hydraulic type) to cause the bar pusher to complete the bar loading movements and withdraw the stub to be scrapped. Along the path of the bar and the pusher are provided guide means 19, e.g. made up of a plurality of annular elements aligned to form a guide and supported elastically for damping of the vibrations produced by high bar speed rotation as is well known in the field.

In FIG. 1 the bar is shown toward the end of its machining, i.e. when the pusher has travelled almost the entire extension of the guide 19. Naturally, the length of the guide and hence the extension of the pusher and its travel will be proportionate to the length of the bar to be fed.

The loader can comprise also automatic sequential insertion means for the bars in the clamp 14, taking the bar from a bar store, and automatic unloading means from the clamp 14 of the residual stub. For the sake of simplicity said automatic means are not shown. They are however commonly used and therefore easily imagined by those skilled in the art. For example, suitable means are shown in Italian patent application MI92A000978 and patent IT 216 871. As shown in the above patent rights, the guide 19 can open longitudinally to allow lateral insertion of the bar taken from the store.

The lathe chuck comprises bar feed means made up of a clamp 20 for grasping the bar and a bush 21 for reciprocating axial movement of the bar during machining. For its movement, the bush 21 runs by means of a known drive 23 along a guide 22 parallel to the bar feed direction. The clamp 20 and bush 21 provide the above described feed movement 'by sections'. Specifically, after the bar has been inserted in the chuck by the loader, the bush 21 begins to feed the bar under the lathe tools shown schematically at 31. After completion of the machining of a section, the bush withdraws by running along the bar to return to the starting position shown in solid lines in the figure and again grasps the bar to push it forward for machining of the following section.

The above description applies to a basically known technology readily imagined by those skilled in the art. For this reason, for example, there are not shown and described in detail the elements which provide the movements, openings and closings of the various chuck parts designed to provide feed by sections. In accordance with the innovative principles of the present invention the guide means extend to the proximity of the moving bush of the lathe and at least their terminal part is kinetically connected to the handling bush 21 of the lathe so as to follow its movements while holding substantially unchanged the spacing between the end of the guide means and the moving bush.

In the embodiment of FIG. 1 the guide means are supported by a truck 24 running in the bar feed direction. For example, the truck comprises a pair of carriages 25, 26 running along a guide 27 supported on the loader frame. The truck 24 is connected to the handling bush 21 of the lathe by means of a tierod 30 so as to follow integrally its movements. Advantageously the truck 24 can support the entire bar guide 19. The bar will thus be supported uniformly along its entire length whatever the position of the moving lathe bush. It is clear that the spacing between the headstock and the guide means can be the least possible.

In use, initially the pusher is completely retracted and a bar is positioned in the guide or in its initial part if the length of the guide is greater than that of the bar, e.g. by known withdrawal means of the bar from the store, as mentioned above. Upon operation of the motor 18 the clamp 14 optionally aided by known bar locking means engages the bar at the rear and begins pushing and insertion thereof into the lathe chuck. When the bar has advanced into the chuck a pre-set amount the bush 21 is operated to grasp the bar and then advance to feed the bar beneath the lathe tools. Upon termination of its forward travel the bush returns to the starting position to again grasp the bar and again begin forward travel.

The bush movement is transmitted to the truck 24 through the bar 30 so that there is not formed any variable space of the bar not supported between the loader and the lathe. The bush can also move forward and backward holding the bar to advance it beneath the tools.

During forward travel of the bush the motor 18 has its feed circuit connected in discharge or under a slight pressure so that the pusher follows the movement given to the bar by the bush without losing its grip on the bar tail.

After termination of machining of the entire bar the motor 18 is reversed so that the scrap bar stub is withdrawn from the lathe. Known unloading means extract the bar stub from the clamp 14 and replace it with a new bar to be machined.

Figure 2:
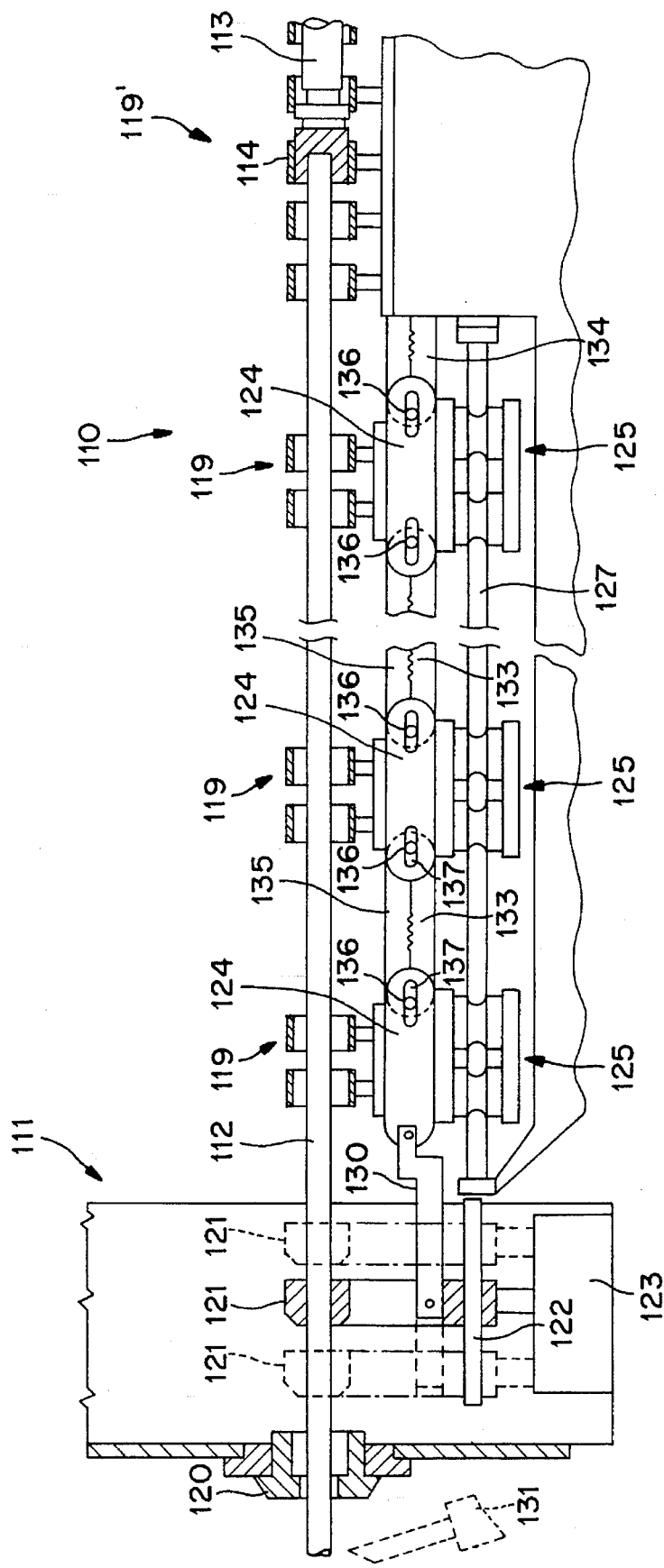
FIG. 2 shows a partial schematic cross section of a second embodiment of a bar loader in accordance with the present invention.

Naturally the above description of an embodiment applying the innovative principles of the present invention is given merely by way of example and therefore is not to be taken as a limitation of the patent right claimed here. For example, FIG. 2 shows a possible variation of the guide with movement following the headstock to keep bar support substantially uniform. To simplify the explanation, in FIG. 2 parts similar to those of FIG. 1 are designated by the same reference number increased by 100. There is thus a loader 110 feeding a lathe 111 a bar 112 by means of a pusher 113 bearing at its head a clamp 114 for grasping the tail of the bar to be fed for sliding it along guide means 119,119' aligned with the chuck. The chuck comprises a clamp or headstock 120 for grasping the bar and a bush 121 commanded to run along a guide 122 by means of a known drive 123 so as to move the bar beneath the tools 131. In FIG. 2 the bush is shown in solid lines and shaded in an intermediate position of its travel whose end positions are shown schematically in broken lines. The pusher moving means are not shown for the sake of simplicity. Said means can however be of any known type. For example, they can be similar to those shown schematically in FIG. 1.

The means of guiding the bar in the loader comprise a first part 119 supported by a first truck 125 connected to the headstock through a tierod 130 as for the embodiment of FIG. 1. After the first part 119 there follows a plurality of guide sections or segments 119 arranged in series. Each section 119 is supported by a base 124 having a truck 125 running along a guide 127 parallel to the bar feed direction. The trucks are interconnected in sequence through elastic connection means, e.g. provided by traction springs 133 each arranged between adjacent trucks. The first truck nearest the lathe is connected to the moving bush 121 by means of the tierod 130 while the last truck in the series is connected to the loader frame through a traction spring 134. Between adjacent trucks there can also be advantageously placed connection elements 135 bearing the ends of pins 136 running in grooves 137 placed on the bases of the trucks and lengthened in the truck movement direction. The running grooves of the pins have sufficient extension to permit against the action of the springs reciprocal withdrawal of the various sections 119 when the moving bush 121 passes from its starting position to the final position.

Optionally there can be provided an initial fixed guide part 119'. Both the first part 119' and the sections 119 can be made up of aligned annular elements as described above for the guide 19.

In use, when the bush 121 pushes the bar into the lathe the sections 119 draw apart entrained by the tierod 130 against the action of the interconnecting springs. When the bush completes the return movement, the springs recall the sections, which draw together again. It is clear that the distribution of the sections remains substantially uniform in every position of the bush 121.

Although for drawing clarity the guide elements 119 are shown widely spaced it is clear to those skilled in the art that the distance between said elements can be very small, the relative travel between adjacent trucks being a fraction of the bush travel and said fraction being given by the total number of trucks. The maximum space formed between the guide sections during movement of the bush can thus be reduced to a negligible amount for bar support with minimum vibrations. For example, with a relatively high number of carriages segments can pass from null spacing or almost to a spacing not greater than that of two guide elements on the same carriage.

At this point it is clear that the purposes have been met by supplying loading devices which provide optimal support of the bar along its entire extension and in particular in the critical zone between the lathe and the loader. It has been found that with devices applying the principles claimed here the vibrations are surprisingly reduced, allowing the lathe machining with high precision.

The embodiments shown are naturally given by way of example and modifications thereto can be readily imagined without thereby going beyond the scope of the patent right claimed here. For example, the structure of the loader and lathe can vary from those shown diagramatically depending on the practical requirements and actual dimensions of the bars machined. In addition, aligned with the moving guides on the loader side opposite the lathe there can be or not be arranged fixed guides for initial support of the bar or pusher. Finally, in addition to the guides other parts of the loader can be supported by the truck connected to the headstock. The loader can also be a multichuck loader.

What is claimed is:

1. In an automatic lathe having thereon movable bar feed means, a device for loading bars into the lathe comprising a frame, guide means on said frame along which is supported and made to run a bar having a leading end thereof projecting from said guide means to be inserted into said lathe to be grasped by said bar feed means for movement thereby parallel to the axis of said bar to effect the feeding of the bar into registry with the machining tools of the lathe, and characterized in that at least a first part of the guide means nearest the lathe is movable and is connected by a tierod to said bar feed means for movement thereby axially with said bar and substantially synchronously therewith at least a second part of the guide means following the first part thereof comprising a series of aligned guide sections supported on said frame for movement in the direction or the bar feed, and interconnected to each other by elastic connections, and the first section of the series thereof being connected to said first part and the last section of the series being connected to a fixed point on said frame by further elastic connections in such a manner that the movement of the first part causes said sections to draw apart and together substantially synchronously with said movement of said first part.

2. The invention in accordance with claim 1 characterized in that each elastic connection comprises stop means operative to prevent the withdrawing of the sections apart from each other beyond a pre-set amount.

3. The invention in accordance with claim 1 characterized in that said at least first part of the guide means is supported on said frame by a truck movable in the bar feed direction.

4. The invention in accordance with claim 1 characterised in that each of the guide sections is supported by a carriage running on a guide extending in the bar feed direction.

5. The invention in accordance with claim 1 characterised in that the guide means comprises a plurality of generally annular elements mutually coaxially aligned to be traversed axially by the bar.

6. The invention in accordance with claim 1 further including a pusher having a forward end engagable with a tail end of said bar and operable to push said bar axially along the guide means to insert the leading end of the bar into the lathe.

7. The invention in accordance with claim 6 including means for operating the pusher, and wherein said operating means comprises a powered chain to which is constrained a rear end of the pusher.

8. The invention in accordance with claim 6 characterised in that the pusher has its forward end bearing a clamp for grasping the tail end of the bar.

9. The invention in accordance with claim 7 characterised in that the operating means for the pusher further comprises a hydraulic motor.

10. In an automatic lathe having thereon reciprocable bar feed means, a device for loading bars into the lathe comprising a frame, movable guide means on said frame defining an elongate passage for supporting therein a bar that is to be inserted into said lathe, a pusher movable on said frame independently of said guide means and extending into one end of said passage, said bar having a trailing end thereof engagable by said pusher to be pushed thereby relative to said guide means toward said lathe, and having a leading end thereof projecting from the opposite end of said passage to be grasped by said bar feed means for movement thereby parallel to the axis of said bar to effect the feeding of the bar into registry with the machining tools of the lathe, and means securing at least a first part of said movable guide means nearest the lathe to said bar feed means for reciprocation substantially synchronously therewith.

11. The invention in accordance with claim 10, characterized in that at least a second part of said guide means following said first part thereof is made up of a series of aligned guide sections supported on said frame for movement in the direction of the bar feed, and interconnected to each other by elastic connections, and the first section of the series thereof being connected to said first part and the last section of the series being connected to a fixed point on said frame by further elastic connections in such a manner that the movement of the first part causes said sections to draw apart and together substantially synchronously with said movement of said first part.

\* \* \* \* \*